Figures 1, 2:
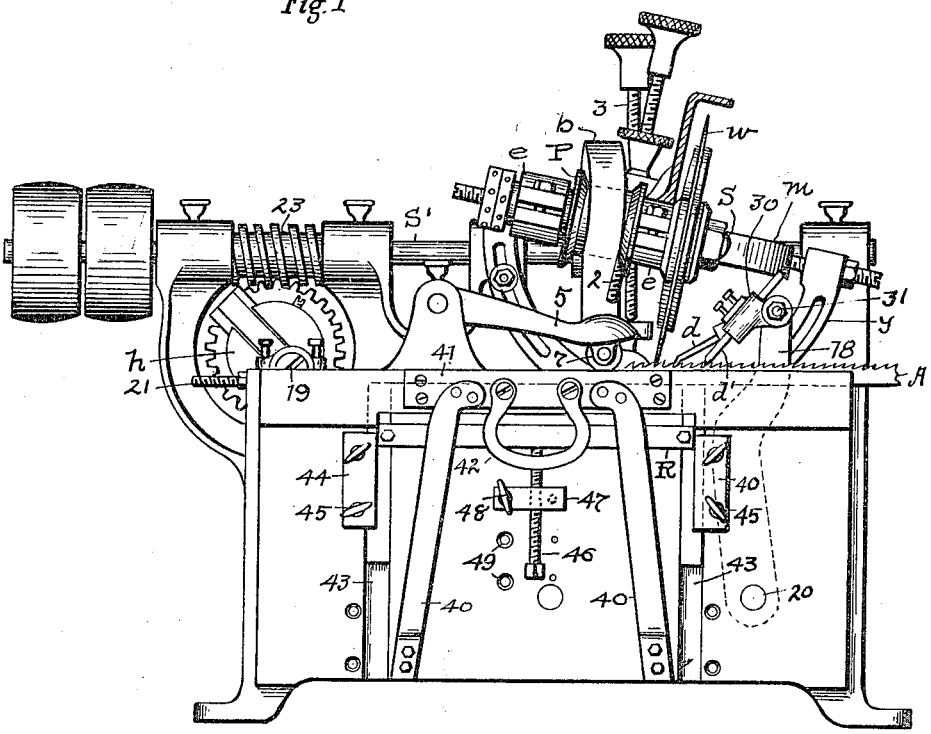

F. W. WARDWELL, Jr.
SAW GRINDING MACHINE.
APPLICATION FILED JUNE 1, 1914.

1,193,643.

Patented Aug. 8, 1916.
4 SHEETS—SHEET 1.

Witnesses.
S. W. Brainard
F. C. Harrold

Inventor:
Frank W. Wardwell Jr.
By Fisher & Moser
His Attorneys.

F. W. WARDWELL, Jr.
SAW GRINDING MACHINE.
APPLICATION FILED JUNE 1, 1914.
1,193,643.
Patented Aug. 8, 1916.
4 SHEETS—SHEET 2.
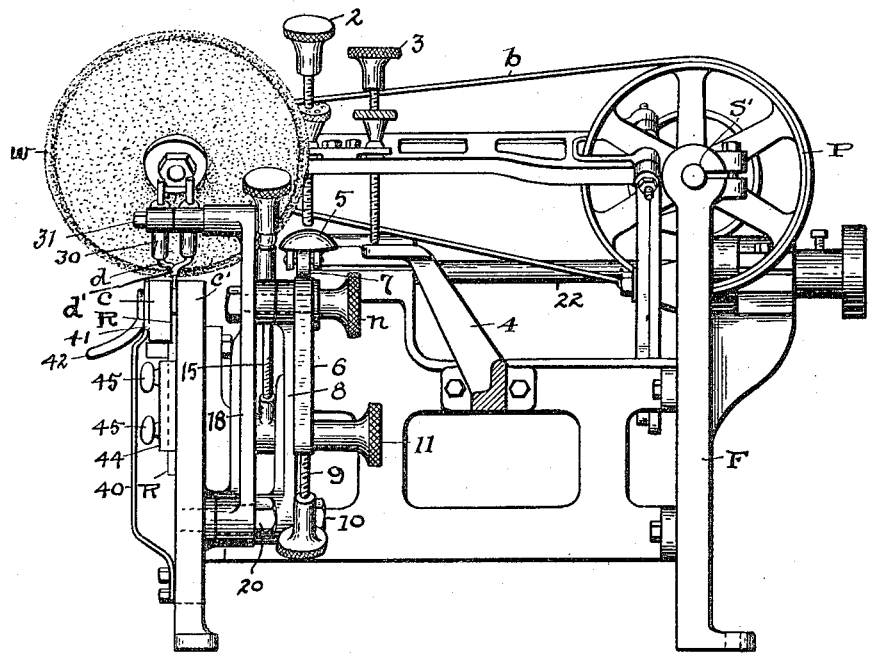

F. W. WARDWELL, Jr.
SAW GRINDING MACHINE.
APPLICATION FILED JUNE 1, 1914.
1,193,643.
Patented Aug. 8, 1916.
4 SHEETS—SHEET 3.
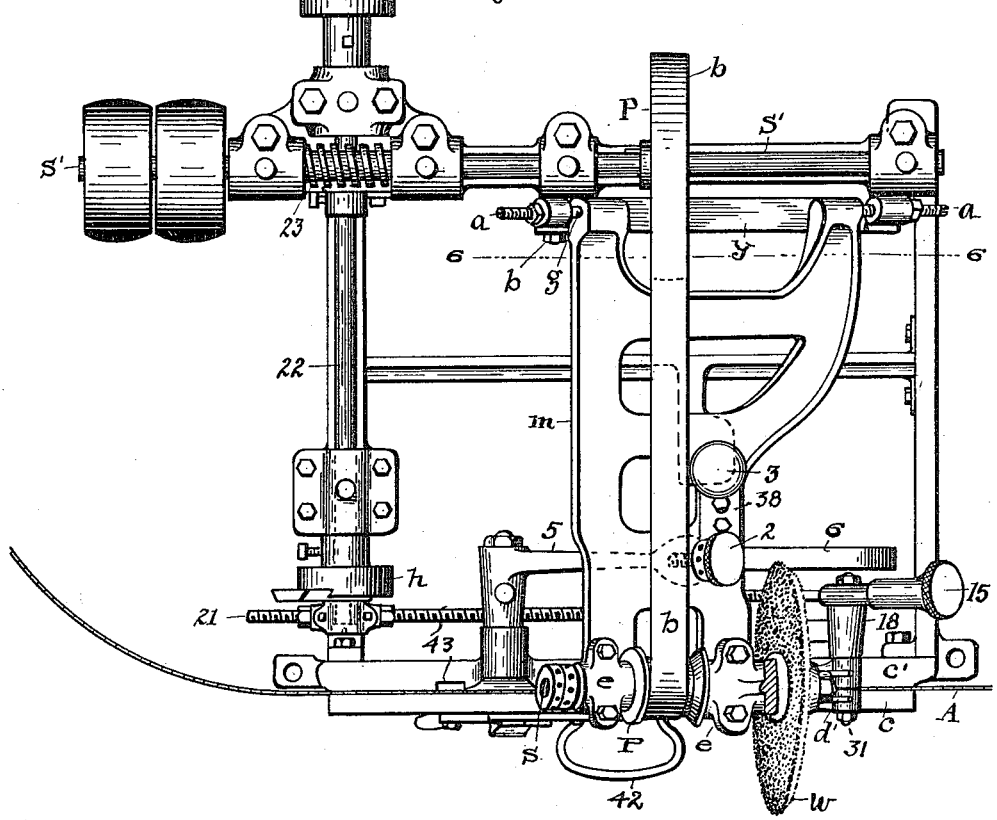
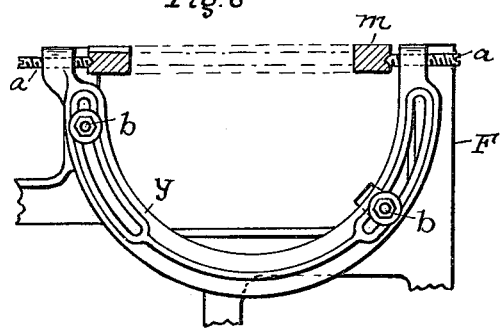
Witnesses.
S. W. Brainard.
J. C. Harrold.
Inventor.
Frank W. Wardwell Jr.
By Fisher & ——
His Attorneys.

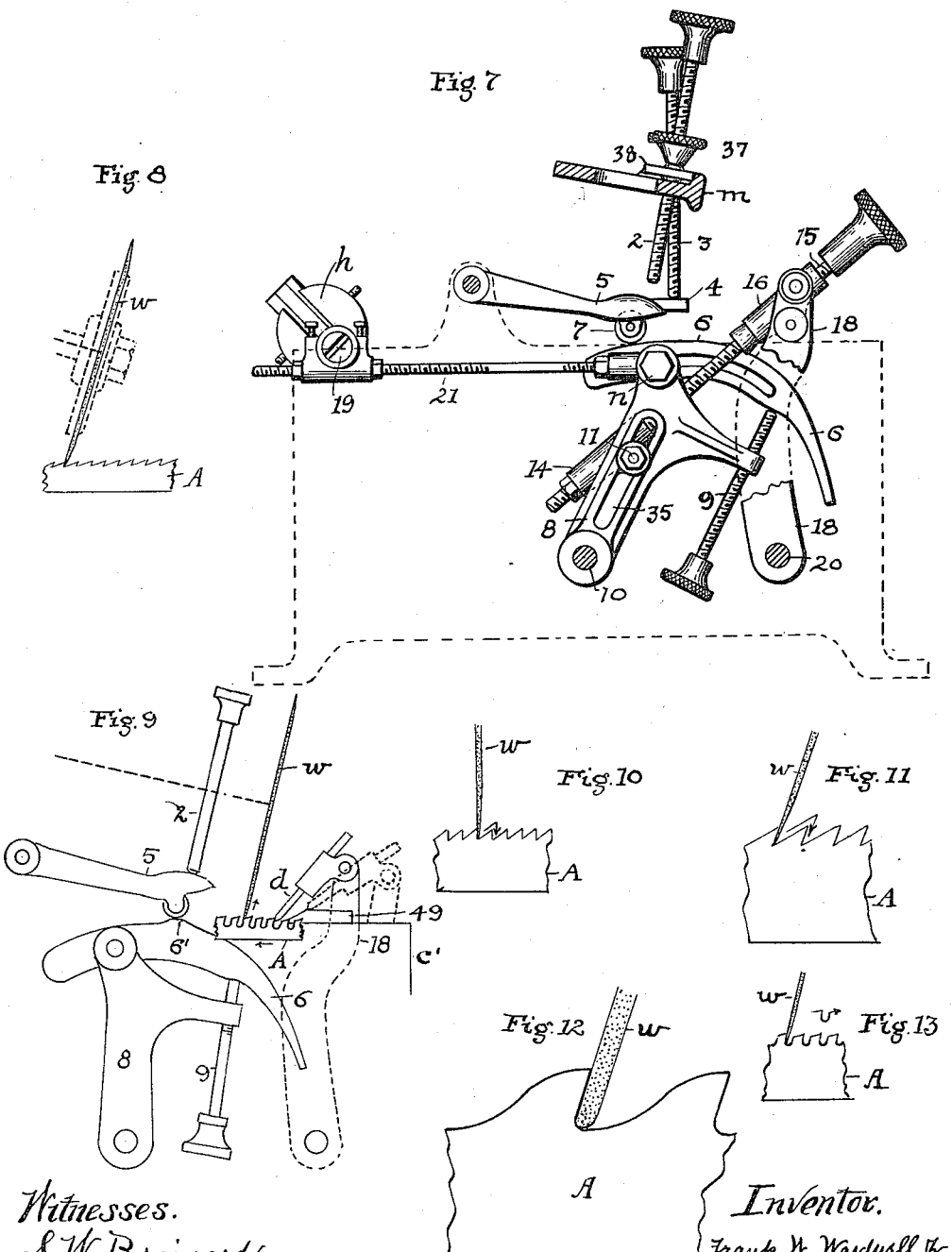

UNITED STATES PATENT OFFICE.

FRANK WELLINGTON WARDWELL, JR., OF CLEVELAND, OHIO.

SAW-GRINDING MACHINE.

1,193,643.　　　　　Specification of Letters Patent.　　Patented Aug. 8, 1916.

Application filed June 1, 1914. Serial No. 842,280.

*To all whom it may concern:*

Be it known that I, FRANK WELLINGTON WARDWELL, Jr., citizen of the United States, residing at Cleveland, in the county of Cuyahoga and State of Ohio, have invented certain new and useful Improvements in Saw-Grinding Machines, of which the following is a specification.

This invention relates to saw grinding machines, and while there is no actual limit as to the kind or shape of saws that may be ground thereon the machine is planned more especially for dressing band saws, and is believed to be original and novel in this, particularly, that it is adapted to grind or sharpen any and every kind of band saw known at this time.

In the accompanying drawings Figure 1 is a front elevation of the machine, and Fig. 2 shows an edge and a side elevation of the adjustable rest for supporting the saw for sliding movement within the clamp of the machine. Fig. 3 is an end elevation of the machine, and Fig. 4 is a cross section of the grinding wheel supporting frame, showing a pair of hand controlled screws wherewith sensitive adjustments are effected to fix the limits of vertical movement of the grinding wheel relatively to the saw. Fig. 5 is a plan view of the machine, and Fig. 6 is a cross section on line 6—6, Fig. 5 of the oscillatory frame which supports the grinding wheel and showing the segmental member which affords a wide range of adjustability of the oscillatory frame and the grinding wheel to different angular positions relatively to the saw. Fig. 7 is a more or less diagrammatic elevation of the adjusting screws and operating parts as they are seen looking in at the front of the machine with the frame removed, but indicated in dotted lines. Fig. 8 is a side view of a short section of a saw having fine teeth and an edge view of a grinding wheel in inclined grinding relation therewith. Fig. 9 is a diagrammatic view of the operating parts, slightly modified to permit grinding of B-toothed saws, such as shown in this figure, and in Fig. 13. Figs. 10, 11, 12 and 13, show different sizes and styles of saws, all of which are adapted to be ground by this machine.

The machine as thus shown employs an emery or like wheel $w$ to grind or sharpen the saw teeth, and the said wheel is preferably relatively thin and supported upon a suitable shaft S, set at an inclination in the machine, and in adjustable position as will presently be seen. The wheel $w$ is made of emery or carborundum united by a binder of rubber and is relatively thin and hard but also capable of yielding without breaking or chipping at the edge, which is sharp. The hard rubber body of the wheel will flex but not break under the pressure of grinding operations and such a wheel possesses spring qualities. The grinding wheel usually used for this purpose has a beveled edge which corresponds with the shape and size of the teeth to be sharpened, and an assortment of interchangeable wheels is necessary to grind different saws. But with a thin sharp edged grinding wheel, and mechanism to cause said wheel to follow the edges of the teeth of the saw, only a single wheel is required to grind different shaped teeth and varying sizes of saws, for example, such a variety as shown in Figs. 8 to 13. Incident to such variety of work to be done by the machine and the different angles at which the wheel $w$ is to work to sharpen widely different angles it is necessary to have somewhat numerous and refined adjustments for the grinding wheel; hence, I provide the means for this purpose shown herein by which the sharpening wheel can be tilted within all needed limits and also moved up and down in varying degree in respect to the saw teeth.

The support for the saw comprises two clamping members $c$ and $c'$ as shown herein, the inner member $c'$ being a portion of the main frame of the machine and the outer member $c$ being located at the front top edge of the frame member $c'$. Power to the grinding wheel shaft S is conveyed from a drive shaft S′ by means of belt $b$ and suitable pulleys P, the larger pulley being on shaft S′, and the smaller on shaft S to get the requisite speed in the wheel $w$. Means are also provided for raising and lowering the wheel $w$ at intervals as the sharpening of the teeth proceeds, that is, as a given tooth is sharpened or dressed the wheel will be automatically raised to follow the saw tooth edge while the saw is being fed forward to bring the next succeeding tooth in position to be sharpened and so on, and this operation also involves the use of feed mechanism for the saw.

Referring, first, to the wheel $w$ and its shaft S, it will be seen that the said shaft rests in bearings $e$ at the front end of the oscillatory frame $m$, which extends transversely across the top of the machine from the rear thereof and brings the said shaft S directly over and parallel with the saw. The said frame $m$ is supported at its outer or rear end between the ends of a so-called yoke or segment $y$ on two pivot screws $a$, and said segment has curved slots in its end portions through which bolts $b$ extend into the frame F of the machine to hold the segment $y$ in any desired adjustment as to lateral inclination. In this way the grinding wheel $w$ may be set at any desired angle corresponding to the vertical edge of the saw tooth to be ground or sharpened, see Figs. 8 to 13. However, the raising and lowering of the oscillating frame $m$ is automatic from tooth to tooth of the saw, and subject to a very fine adjustment to working positions as well. Thus, the said frame $m$ is provided with two adjusting screws 2 and 3 adapted to be adjusted and locked at different elevations, and the screw 3 is adapted to engage and rest on the top of a fixed arm 4 and thereby determine the depth of grinding to be effected on the saw tooth by the grinding wheel $w$. The raising and lowering oscillatory movements of the frame $m$ is by means of a pivoted arm 5, Fig. 7, which is adapted to engage the screw 2 and the said arm 5 has a roller 7 on its bottom which rides upon a cam member comprising a curved finger 6 having a slot therein and this finger is adjustably fastened by a bolt $n$ to the upper end of a rock-arm 8, which is pivoted at 10 and has a set screw 9 in its side extension bearing against and supporting finger 6 at its outer end.

The rock-arm 8 has a longitudinal slot and a screw or bolt 11 extends through the same to support an internally threaded barrel 14 in which a long screw rod 15 is engaged, and the said rod 15 passes through another threaded barrel 16 which is pivotally mounted on the upper end of an oscillatory arm 18 pivoted at 20 and adapted to carry the pawls or dogs $d$ and $d'$ for feeding the saw forward during grinding operations.

A rocking motion is imparted to the rock-arm 8 by a connecting rod 21 engaging with the bolt $n$ and with an eccentric or crank pin 19 adjustably mounted on the rotatable head $h$ on the end of a transverse shaft 22 having a gear in driving relations with worm 23 on the shaft S', Figs. 1 and 5. The rocking movement of member 8 and its cam finger 6 oscillates arm 5 and the frame $m$ and the amount of oscillatory movement is dependent upon the shape of the cam surface and the adjustment or setting of the cam finger 6.

Obviously, when the member 8 is swung to the left, Fig. 7, the finger 6 is raised more or less and the arm 5 and the frame $m$ carrying the grinding wheel $w$ are raised correspondingly. In this interval the saw is moved lengthwise the distance of a single tooth, and the means to accomplish this movement are seen in Fig. 1, particularly, and also in Figs. 3 and 7. Thus, in Figs. 1 and 3, we see two pawls, $d$ and $d'$ arranged one in advance of the other and bent inward from the opposite sides, Fig. 3, to engage different saw teeth, and said pawls are adjustably secured in separate or individual holders 30 which have rotative play on the transverse stud or bolt 31 at the top of the arm 18. The pawls 30 are in duplicate so as to insure a positive feed of the saw, and a greater or less throw can be given to the arm 18 and the pawls $d$ and $d'$ by shifting the pivot connections 11 of the screw 15 in the slot 35 of arm 8 and by changing the throw of the eccentric pin 19 on crank head $h$.

The adjusting screws 2 and 3 for frame $m$ may be projected and placed in any desired inclined position relatively to frame $m$ as said screws are mounted in ball bearings 36, held in suitable sockets or seats by a clamping plate 38. In this way the screws 2 and 3 may be set in the exact working position required in connection with the stop 4 and the arm 5 when the frame $m$ is tilted to change the angle of inclination of the grinding wheel to the saw, and lock nuts 37 fix the screws in any adjusted position in the ball bearings 36.

The saw is frictionally clamped and held, and to this end the outer clamping member or bar $c$ is supported by means of two bowed springs 40 which are fixed to the main frame at their lower ends and are constructed and arranged to impart an inward pressure at their upper ends where they press against the said plate or bar $c$, through the plate 41 fixed thereon. Pull on the handle 42 separates the clamping bar $c$ from the frame $c'$ and permits the saw to be removed or inserted. and the saw when in place between the plates $c$ and $c'$ is supported by a vertically adjustable rest R, Figs. 2 and 3, which occupies a guide way 43 at the front of the machine and is confined thereon by cleats 44 and thumb screws 45. A sensitive adjustment of the rest R to different elevations is obtained by a set screw 46, see Fig. 1. Saws of any width may be clamped at any suitable elevation and in proper feeding relations to the grinding wheel by the arrangement described. The set screw 46 is supported by a bracket 47 which may also be affixed at different elevations on the front face of frame member c' by means of a thumb screw 48 and the several thumb screw openings 49, see Fig. 1.

The machine described is capable of grinding band saws of all kinds, either coarse or fine, large or small. In fact the adjustments permit a perfectly timed feed and perfect grinding of saw teeth as fine as twenty-six to the inch, and any shape or size of band saw tooth may be ground by a following movement of the grinding wheel and using only a single cam. For example, a very difficult saw tooth to grind and sharpen is illustrated in Figs. 9 and 13,—a so-called B-tooth. But no difficulty is experienced in sharpening this form of tooth by my machine, providing the cam surface 6'' of finger 6, Fig. 9, which controls the movement of arm 5 is of the right shape to raise and lower the grinding wheel at the proper time to obtain a following movement of the edge of each tooth as the saw is fed along by pawl d. The feeding movement of the saw is intermittent particularly in the case of a B-toothed saw, and the rest period is during the return or back stroke of the pawl. If this rest period is prolonged and the movement of the pawl is greater than the distance of one tooth the pawl may be prevented from engaging more than one tooth at a time by causing the pawl to ride upon an inclined lift plate 49 at one side of the saw, see Fig. 9.

What I claim is:

1. In a machine as described, an adjustable saw support and means to feed a saw therein step by step, in combination with a grinding wheel and an adjustable supporting frame therefor, comprising an adjustable cam to raise and lower said frame in respect to said saw, and a rocking arm carrying said cam.

2. A saw grinding machine having an adjustable rest and a spring clamp for a saw, in combination with a flexible wheel to grind the saw, an oscillatory member having means adjustably connected therewith to move the saw lengthwise and a cam member and means adjustably mounted thereon to raise and lower the said wheel into grinding positions with respect to the said teeth, the said means comprising a rocking arm on which said cam member is pivoted and means on said arm to raise and lower said member at its free end.

3. A saw grinding machine having a saw support at its front, a transversely positioned frame and an adjustable yoke on which said frame is pivoted at its rear end and adapted to fix the angle of the grinding wheel, a shaft and a grinding wheel thereon mounted on the front end of said frame, an adjustable stop to limit the drop of said frame, and an adjustable cam finger adapted to raise and lower the said frame in respect to said stop.

4. A saw grinding machine having a grinding wheel, a shaft carrying said wheel, a pivoted frame carrying said shaft and an adjustable yoke on which the inclination of said frame can be changed in respect to a horizontal plane, a pivoted arm and a screw adjustable in said frame engaging said arm, and adapted to fix the working elevation thereof, a rock-arm and a cam member adjustably secured thereon and adapted to raise and lower said arm, and means to raise and lower the free end of said cam member.

5. In a saw grinding machine, a main frame, a grinding wheel and a pivoted frame carrying said wheel at its free end and a segmentally curved yoke adjustable on the said main frame on which said pivoted frame is supported at its rear, in combination with a rocking member, a slotted cam finger adjustably mounted on said rocking member, a pivoted arm and means connected with said frame and engaging said arm and adapted to fix the elevation of the frame.

6. A saw grinding machine having a frame pivoted at its rear end and adapted to move up and down at its front end and a grinding wheel mounted on said front end, in combination with means to raise and lower the free end of said frame comprising a rocking member and a segmental cam pivotally mounted on the upper end of said member and slotted lengthwise for adjustment thereon, an adjusting screw mounted on said member in engagement with said slot and an adjusting screw on said member adapted to raise and lower the free end of said cam.

7. A saw grinding machine having a grinding wheel, a pivoted frame carrying said wheel, and adjustable devices to set said frame in various inclined positions relatively to a horizontal line, a ball and socket support for adjustable devices carried by said frame, and a lift member for said frame engaged by said devices.

8. In a saw grinding machine, a grinding wheel and a pivoted support therefor, in combination with means to raise and lower said support at predetermined intervals comprising a rocking member, a curved cam adjustably secured to said member and adapted to be raised and lowered independently in respect thereto, an arm resting on said cam and adapted to raise said pivoted support, and a screw adjustably mounted on the free end of said arm and adapted to fix the drop of said support.

9. A saw grinding machine having a clamp for a saw and means to move the saw along tooth by tooth in said clamp, a power actuated rocking member, a pivoted arm adjustably and operatively connected with said member to rock therewith, and a pawl on the upper end of said arm adapted to engage the saw in said clamps, in combination with a grinding wheel and means carrying said wheel in actuated connections with said rocking member.

In testimony whereof I affix my signature in presence of two witnesses.

FRANK WELLINGTON WARDWELL, JR.

Witnesses:
R. B. MOSER,
B. C. TAYLOR.

Copies of this patent may be obtained for five cents each, by addressing the "Commissioner of Patents, Washington, D. C."